(12) United States Patent
Mølgaard

(10) Patent No.: US 9,038,058 B2
(45) Date of Patent: May 19, 2015

(54) CONFIGURATION OF SOFTWARE FOR A WIND TURBINE

(75) Inventor: Emil Mølgaard, Skanderborg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 12/580,671

(22) Filed: Oct. 16, 2009

(65) Prior Publication Data

US 2010/0100249 A1   Apr. 22, 2010

Related U.S. Application Data

(60) Provisional application No. 61/106,248, filed on Oct. 17, 2008.

(51) Int. Cl.
*G06F 9/445* (2006.01)

(52) U.S. Cl.
CPC .................................. *G06F 9/44505* (2013.01)

(58) Field of Classification Search
None
See application file for complete search history.

(56) References Cited

U.S. PATENT DOCUMENTS

| | | | |
|---|---|---|---|
| 5,499,357 A * | 3/1996 | Sonty et al. | 710/104 |
| 6,370,681 B1 * | 4/2002 | Dellarocas et al. | 717/110 |
| 6,968,183 B2 * | 11/2005 | Sandberg | 455/418 |
| 6,983,449 B2 * | 1/2006 | Newman | 717/121 |
| 7,216,332 B2 * | 5/2007 | Smith | 717/106 |
| 7,761,859 B2 * | 7/2010 | Low | 717/140 |
| 2003/0088867 A1 * | 5/2003 | Sandberg | 717/171 |
| 2003/0177412 A1 * | 9/2003 | Todd | 714/25 |
| 2005/0066016 A1 * | 3/2005 | Bailey et al. | 709/220 |
| 2006/0230314 A1 * | 10/2006 | Sanjar et al. | 714/26 |
| 2007/0106562 A1 * | 5/2007 | Negley | 705/26 |
| 2007/0118626 A1 * | 5/2007 | Langen | 709/221 |
| 2009/0037879 A1 * | 2/2009 | Iyengar et al. | 717/121 |
| 2009/0102196 A1 * | 4/2009 | Altemark et al. | 290/44 |
| 2009/0276486 A1 * | 11/2009 | Tandon et al. | 709/203 |
| 2010/0131942 A1 * | 5/2010 | Nannenga et al. | 717/176 |

* cited by examiner

*Primary Examiner* — Jue Louie
(74) *Attorney, Agent, or Firm* — Patterson + Sheridan, LLP

(57) ABSTRACT

Method and system of configuring a wind turbine software package having a multitude of software components includes providing a plurality of software components; providing information relating to component parameters for the software components; providing rules relating to compatibility between the component parameters; and establishing the configuration by performing a series of iterations, wherein each iteration includes defining a group of component parameter values based on the rules; receiving an input parameter selected from the groups of component parameter values; and updating a component parameter based on the input parameter. A system for establishing a configuration of a software package includes a storage device having the pertinent information stored therein, and a communication unit adapted to transmit the software package and/or the configuration to a computer device in a wind turbine.

17 Claims, 4 Drawing Sheets

CONFIGURATION OF SOFTWARE FOR A WIND TURBINE

CROSS-REFERENCE TO RELATED APPLICATIONS

This application claims the benefit of U.S. Provisional Application No. 61/106,248, filed Oct. 17, 2008, the disclosure of which is incorporated by reference herein in its entirety.

TECHNICAL FIELD

The present invention relates to a method for configuring software for a wind turbine.

BACKGROUND

A modern wind turbine is a complex piece of machinery composed of many parts. The wind turbine comprises many different components, and some wind turbines may even be designed on a modular basis, where an operator chooses the components or modules based on a specific intended use, such as, for example, specific modules required or most suitable for offshore wind turbines, etc.

As each wind turbine may include a large number of hardware components, the software needed to operate and control the components becomes more complex. In order to ensure that the correct software is provided to the wind turbine controller there is a need to ensure that the correct software components are provided to the controller unit in the wind turbine, e.g., an onboard computer device or controller device.

Furthermore, each software component needs to be configured. The software components may need correct parameter setting in order to operate correctly. It is contemplated that as the number of software components increase, so does the number of parameters to be defined.

Generally, the process of determining whether a collection of software components and the collection of modules will work together is a complex task and a computer program is often used to help solve this task. Such a computer program must work with the inter-dependencies of the software and hardware in an efficient and precise manner.

SUMMARY

One embodiment in accordance with the invention provides a method of establishing a configuration of a software package having a multitude of software components for a wind turbine. The method may include the steps of providing a plurality of software components; providing, for each of the plurality of software components, information relating to a group of features for the software component; providing rules relating to compatibility between the features of the plurality of software components; and configuring the software package by performing a series of iterations. Each iteration includes: choosing a software component; selecting a feature for that software component; and confirming that the selected feature is compatible with previous selected features for previous selected software components.

Another embodiment in accordance with the invention relates to a system adapted to establish a configuration of a software package having a multitude of software components for a wind turbine. The system may include a storage device adapted to store: i) a plurality of software components; ii) information relating to a group of features for each of the software components; and iii) rules relating to compatibility between the parameter of the plurality of software components. The system may further include a communication unit adapted to transmit the software package and/or the configuration to a computer device in the wind turbine. The computer device in the wind turbine may be a controller unit electrically communicating with a storage device, such as for example, a memory unit.

BRIEF DESCRIPTION OF THE DRAWINGS

The accompanying drawings, which are incorporated in and constitute a part of this application, illustrate embodiments of the invention and, together with a general description of the invention given above, and the detailed description given below, serve to explain the invention.

DETAILED DESCRIPTION

Figure 1:
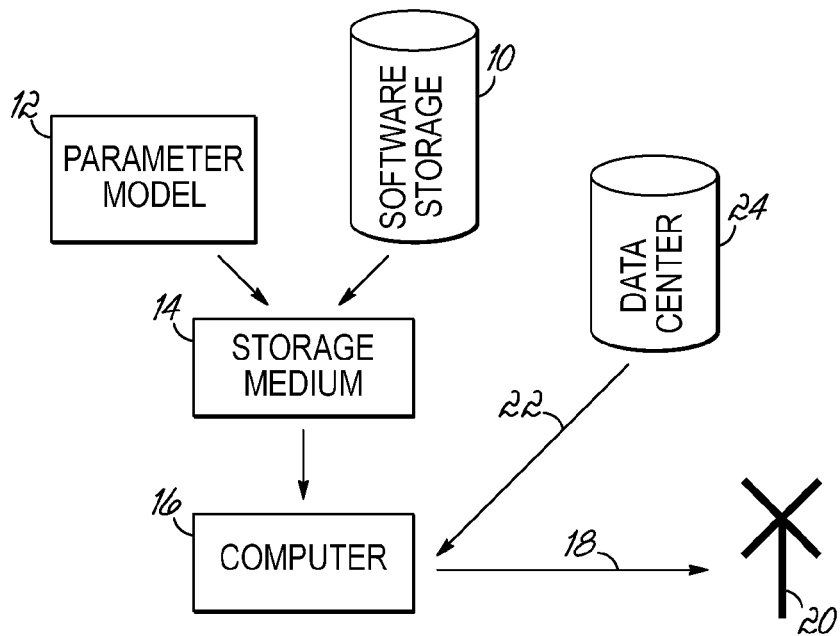
FIG. 1 is a schematic illustration of a system including a configuration tool for wind turbine software.

A wind turbine is a complex product. The wind turbine is composed of many parts. The parts may include many standard parts or at least parts having a well-defined function. Many parts of a wind turbine interact with various other parts in the wind turbine. Some parts require interaction or connection to specific other parts and do not work well or at all with certain other parts. Also, for the parts to operate properly, software for controlling the parts should include the correct modules or a correct configuration file for the hardware to operate optimally. In worst case, the wind turbine may not function at all if the correct software modules are not downloaded and/or activated.

Also, each software component needs to be configured. The software components may need correct parameter settings in order to operate correctly. The software modules may require one or more parameters in order to be correctly configured. The number of software modules may increase the complexity of the task of configuring the software package. There is also a need to ensure that the parameters are only defined and input to the software package once. Further, there is a need to ensure that parameters are selected, set, and/or defined in a way that the parameters are mutually compatible and non-interfering.

Furthermore, when the wind turbine has been configured, i.e., all relevant modules are selected, software to drive and control the wind turbine is to be configured and downloaded to the wind turbine. Usually, the software is configured and downloaded on site by a service person after the wind turbine has been erected. The configuration may be performed on-site or simply applied and the software package downloaded, as will be described below.

One approach of configuring a device includes the use of a product model. A product model of a complex product is often made by regarding the product as being composed of several generic components. For each of these components, there is a group of specific alternatives or features. In the present context, the term product model is also contemplated to relate to the software package to be configured.

As the number of physical modules in the wind turbine increase, the complexity of the software package also increases, as does the number of parameters to be defined. Also, existing hardware may be upgraded or replaced from previous models which also require existing software to be modified or reconfigured. New modules require new or modified software modules or components.

The software package may simply be downloaded as one large package and relevant software components or modules may be activated via a configuration file or the like. In the alternative, a configuration system may compile or assemble the appropriate software packages by selecting components or modules to be downloaded. Further alternatively, a configuration file may be downloaded to the control unit in the wind turbine.

In all cases, there is a need to ensure that the correct software package and/or modules are selected, downloaded and/or activated, e.g., by using a configuration file.

FIG. 1 schematically illustrates a workflow starting from a software storage having software modules 10. A parameter model 12 is used for storing attributes of the software modules. The attributes are later used for determining which modules are compatible, etc.

When a new wind turbine or a plurality of wind turbines are to be erected, the software modules 10 and the parameter model 12 may be transferred to a storage medium 14. The storage medium may be a CD, DVD, hard drive, flash drive or the like. Also, the software modules 10 and the parameter model 12 may be transferred directly to a computer 16, such as, for example, via a network connection. A technician may then operate the computer 16 using a configuration tool to configure a software package to be downloaded or transferred over a communications link 18 to a wind turbine 20.

The configuration tool is preferably implemented with a software interface facilitating the configuration by allowing the user or operator to perform the configuration in a predefined sequence. The configuration is performed using the parameter model 12. The parameter model 12 defines the relationships between the software modules 10. A copy of the configuration may also be transmitted as a parameter set over a communications link 22 to a database at a data center 24 located remotely from the wind turbine 20, where a parameter report may be generated. A central computer at the data center 24 may access the database and provide a user with an overview of the configuration of one or more wind turbines 20.

The concept of a product model may be illustrated by the following simplified example.

A wind turbine includes a tower with blades attached at a nacelle housing. The product model may then include the features 'blade length' with the possible values or alternatives 'short' or 'long' and the feature 'tower height' with the possible values or alternatives 'short' or 'high'. There may be a rule dictating that if the 'long' value of the 'blade length' feature is selected the 'high' value of the 'tower height' must be selected. Furthermore, there may be restrictions on the types of gear, etc.

Figure 2:
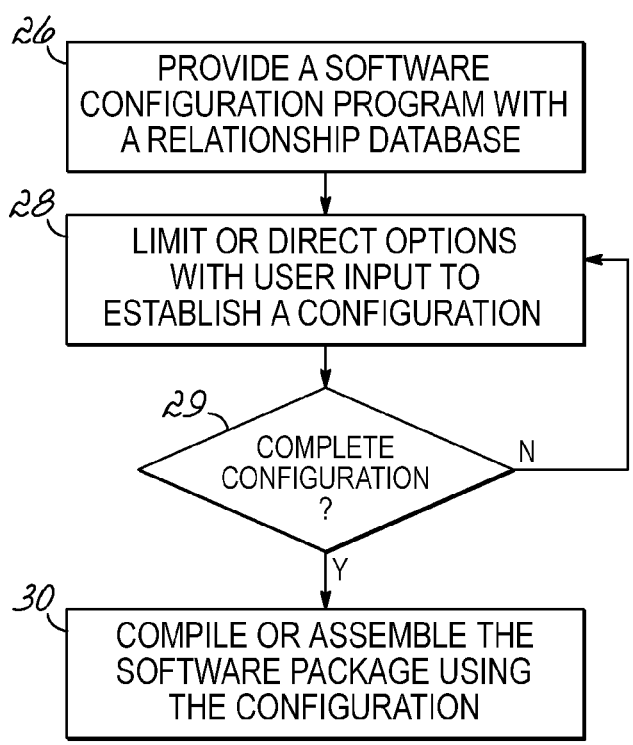
FIG. 2 is a schematic illustration of some steps in an exemplary method according to an embodiment of the present invention.

One embodiment according to the invention provides a method for configuring a software package. The software package is configured to match the hardware configuration. The steps are generally illustrated in FIG. 2.

In block 26, a user such as a technician, service person or the like uses a computer with a software configuration program having access to a database including definitions of the relationships between software components and hardware components, and between software components, illustrated in FIG. 1 as reference numerals 10 and 12.

The software configuration program, in block 26, comprises a graphical interface allowing the user using the software to easily establish a configuration. The software configuration program uses the information in the database including definitions of the relationships to ensure that the user is only allowed to select proper options, i.e., compatible program modules.

The user input is used in block 28 to limit or direct the subsequent possible options for the user in the next steps of the configuration.

The step in block 28 is performed until a complete configuration is achieved, as indicated in block 29. The configuration is, in one embodiment, used for compiling or assembling in block 30 the software package to be downloaded to the wind turbine. In another embodiment, the configuration is used to compile a configuration file to be downloaded to the wind turbine. The wind turbine includes a controller device, such as a computer unit or the like, for controlling the operation of the various parts of the wind turbine. Also, the wind turbine includes a data storage device, such as a hard drive, flash drive, optical storage or the like, for storing the software components and/or the configuration file.

In an exemplary embodiment, the method may include establishing a software package based on the configuration by creating a configuration file. The configuration file may, for example, be a text file or a data file readable by the control software in the wind turbine controller.

In a further embodiment, the method may include establishing a software package based on the configuration by selecting and downloading software components to the wind turbine. The software package is preferably downloaded to a controller unit or controller computer as described above. The software package may be compressed, encoded, or both compressed and encoded.

In one aspect in accordance with an embodiment of the invention, the information relating to a group of features for the software components may be stored in a database. The database may be located on a server or computer on which a software implementation of the configuration method according to the present invention is stored and executed.

In another aspect in accordance with an embodiment of the invention, compatibility between software components may be stored in a directed acyclic graph. The directed acyclic graph may help ensure that the information is stored in a safe and reliable manner so that when a user is configuring the software package, the compatibility between components are maintained and complied with.

For increased reliability and overview of a number of wind turbines, a copy of the configuration may be transmitted to a database located remotely from the wind turbine. This is contemplated to allow a central computer to provide a user with an overview of the configuration of one or more wind turbines.

Figure 3:
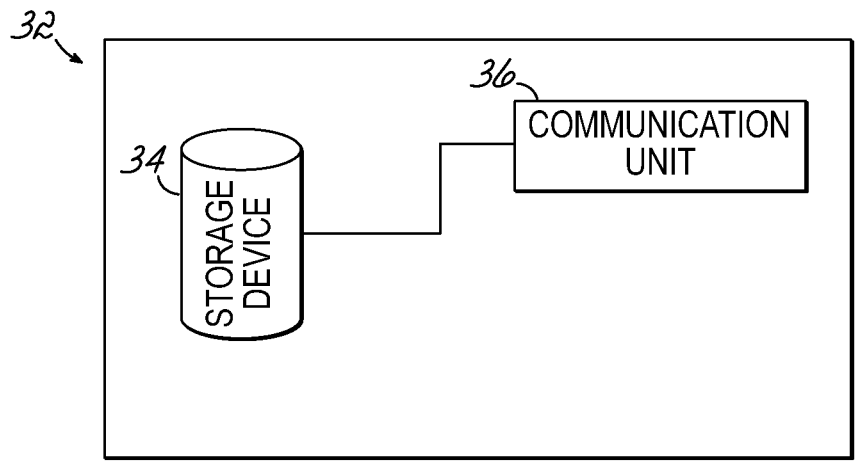
FIG. 3 is a schematic illustration of a system in accordance with one embodiment of the invention.

FIG. 3 schematically illustrates a system 32 adapted to establish a configuration of a software package having a multitude of software components for a wind turbine. The system 32 includes a storage device 34 adapted to store a plurality of software components. The storage device 34 is further adapted to store, for each of the plurality of software components, information relating to a group of features for each software component. Still further, the storage device 34 is adapted to store rules relating to compatibility between the features of the plurality of software components. Even further, the storage device 34 is adapted to store configuration information regarding the software package. The system 32 further includes a communication unit 36 adapted to transmit the software package to a computer device in a wind turbine. In one exemplary embodiment, communication unit 36 is a network device, and TCP/IP over Ethernet is used. In alternative embodiments, the communication unit 36 may be a modem or a serial port.

Furthermore, the storage device 34 may be adapted to store rules relating to compatibility between the features of the plurality of software components. The storage device 34 may further comprise configuration information regarding the software package, and a communication unit adapted to transmit the software package to a computer device in a wind turbine.

Figure 4:
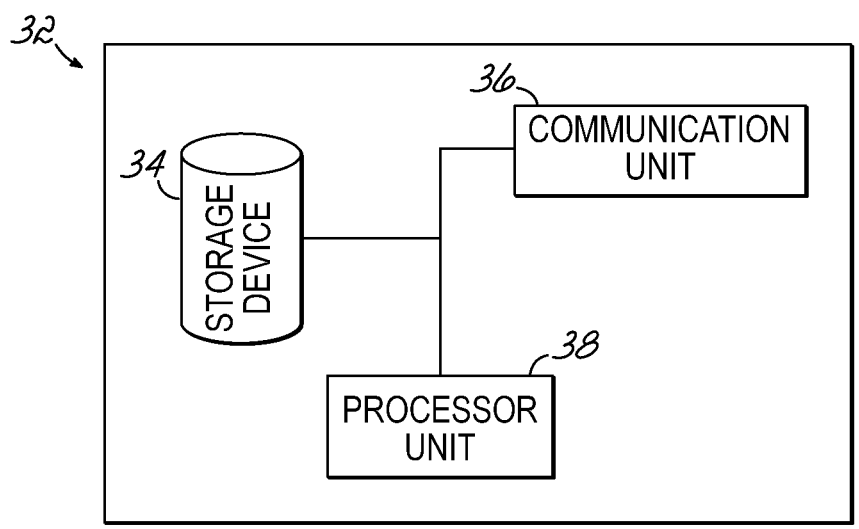
FIG. 4 is a schematic illustration of a system in accordance with another embodiment of the invention.

As described above, the system 32 is preferably a computer unit. As schematically illustrated in FIG. 4, the computer unit may further include a processor unit 38 for controlling configuration software used by the user to establish the configuration of the software package.

Figure 5:
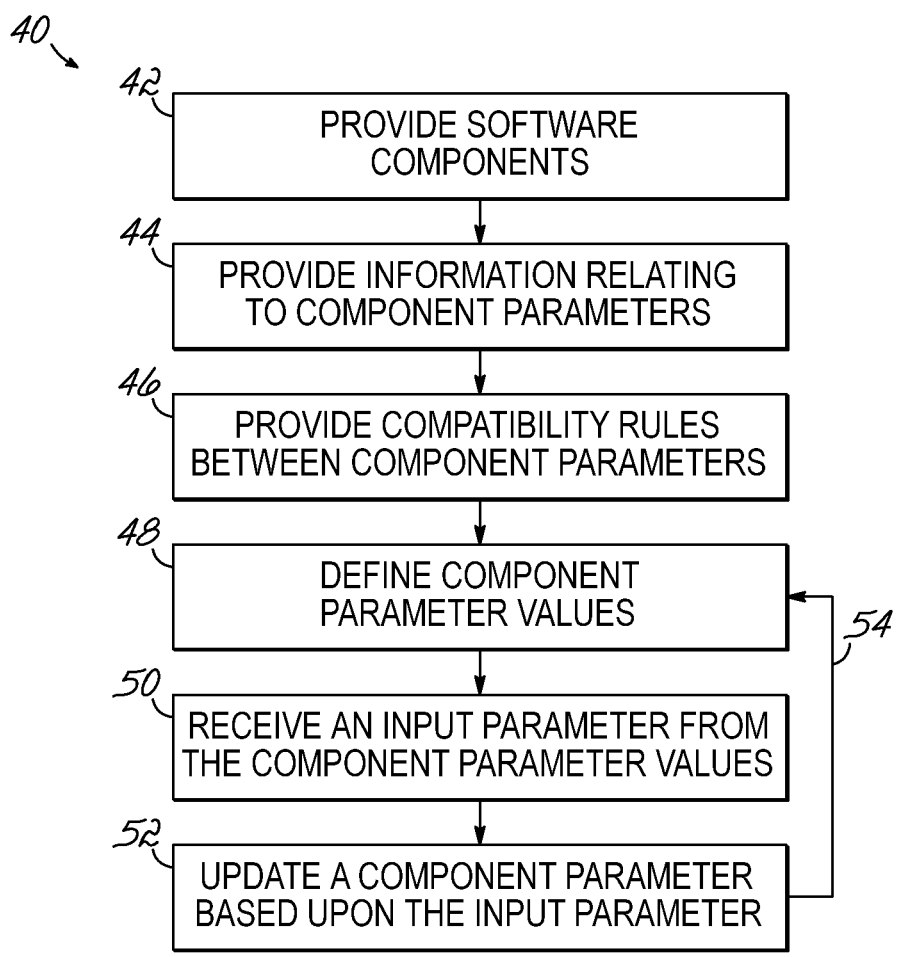
FIG. 5 is a schematic illustration of a method in accordance with one embodiment of the invention.

FIG. 5 schematically illustrates a method 40 of configuring a wind turbine software package having a multitude of software components. The method 40 includes the steps of providing a plurality of software components 42; providing, for each of the plurality of software components, information relating to component parameters for the software components 44; and providing rules relating to compatibility between the component parameters 46. Further, the method 40 includes establishing the configuration by performing a series of iterations, each including: defining a group of component parameter values based on the rules 48; receiving an input parameter selected from the groups of component parameter values 50; and updating a component parameter based on the input parameter 52. The steps 48, 50 and 52 are repeated as illustrated by the arrow 54.

Figure 6:
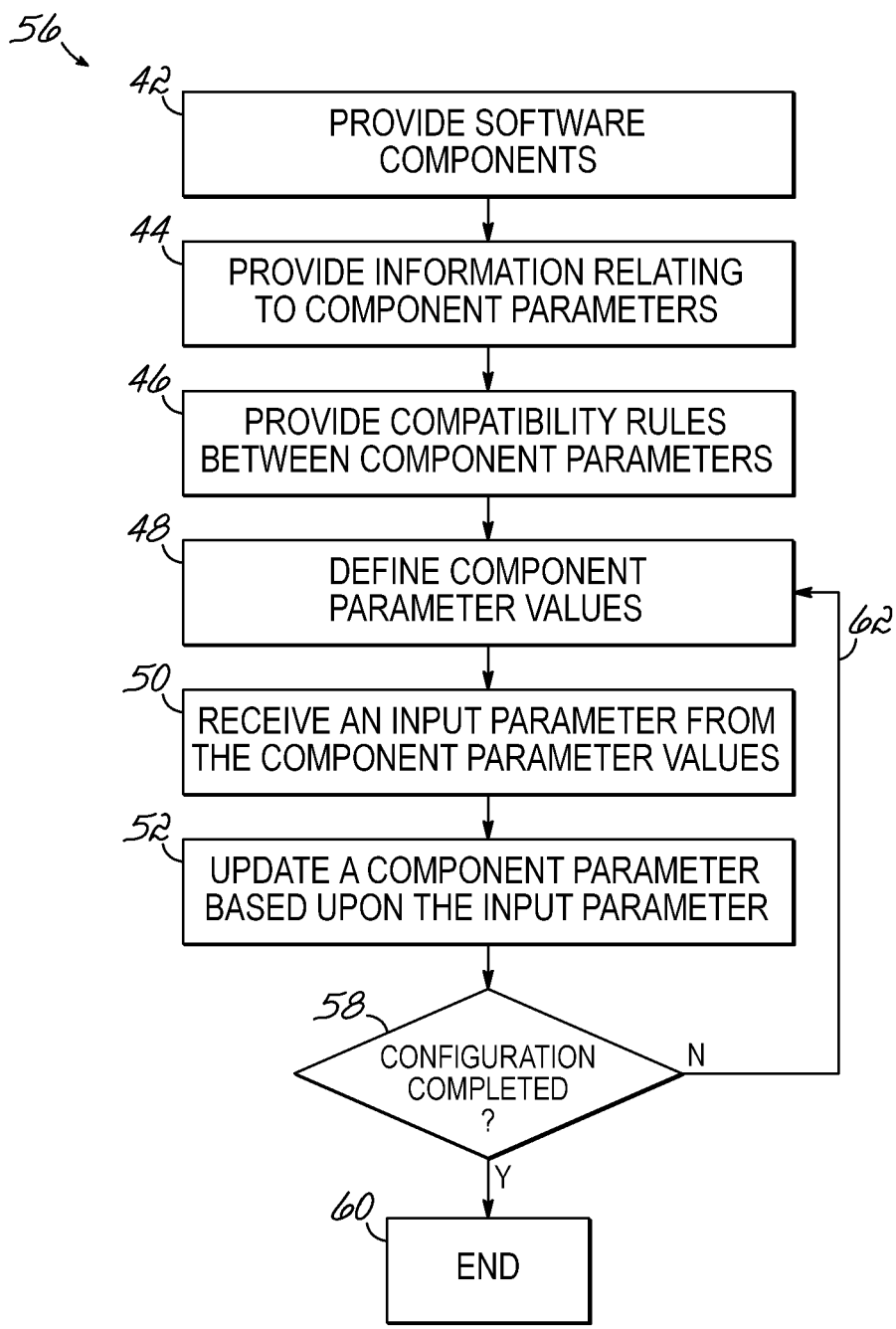
FIG. 6 is a schematic illustration of a method in accordance with another embodiment of the invention.

FIG. 6 schematically illustrates a method having steps similar to the method illustrated in FIG. 5. The similar steps are given the same reference numerals as in FIG. 5.

The method 56 illustrated in FIG. 6 further includes an evaluation 58 of the status of the configuration. If the configuration is not completed, the method reiterates or returns to the step 48, as illustrated by the arrow 62. If the evaluation shows that the configuration is complete, then the method comes to an end 60.

The above is contemplated to provide a method and system wherein the rules for configuring a wind turbine are defined in a structured way in a product model. This product model may then be used to dynamically generate the user interface of a PC based service tool that guides the user or operator to create the correct configuration. The resulting configuration is then transferred to the wind turbine controller.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A computer-implemented method for program-assisted configuration of a wind turbine software package for controlling operation of a wind turbine, the method comprising:
providing a plurality of software components each corresponding to a respective hardware component of a wind turbine product model separate from the wind turbine and representing a plurality of hardware components of the wind turbine, the wind turbine comprising at least one of a controller unit, a data storage unit, and a tower with a plurality of blades attached at a nacelle housing;
providing, for each of the plurality of software components, parameter information specifying one or more of a plurality of wind turbine component parameters of the wind turbine product model including blade length and tower height, wherein the blade length is associated with component parameter values of short and long, wherein the tower height is associated with component parameter values of short and high;
providing a set of wind turbine parameter compatibility rules pertaining to the plurality of wind turbine component parameters and including a first wind turbine parameter compatibility rule specifying to prohibit a user from setting the tower height to short when the blade length is set to long; and
establishing a wind turbine configuration for the wind turbine software package by performing a series of iterations, each iteration comprising defining a group of wind turbine component parameter values based on the wind turbine parameter compatibility rules, receiving, as user input, an input parameter value selected from the groups of wind turbine component parameter values corresponding to a hardware component of the wind turbine, and updating a wind turbine component parameter based on the input parameter value;
wherein at least one iteration in the series further comprises programmatically limiting the group of wind turbine component parameter values in the next iteration in the series based on the input parameter value and the wind turbine parameter compatibility rules, in order to prohibit the user from applying a subsequent input parameter value incompatible with a previous input parameter value, wherein the user is in a first instance only permitted to set the tower height to high, based on the first wind turbine parameter compatibility rule.

2. The method according to claim 1, wherein establishing the wind turbine configuration further comprises:
creating a configuration file.

3. The method according to claim 1, further comprising:
establishing the wind turbine software package based on the wind turbine configuration by selecting a set of software components from the plurality of software components; and
downloading the wind turbine software package to the wind turbine.

4. The method according to claim 1, further comprising:
storing the parameter information for the plurality of software components in a database.

5. The method according to claim 1, further comprising:
storing compatibility information between software components in a directed acyclic graph.

6. The method according to claim 1, further comprising:
transmitting a copy of the wind turbine configuration to a database located remotely from the wind turbine.

7. The method according to claim 1, further comprising:
transferring a file containing the wind turbine configuration for the wind turbine software package to a controller for the wind turbine.

8. A computer-implemented method for program-assisted configuration of a wind turbine software package for controlling operation of a wind turbine, the method comprising:
providing a database including definitions of relationships between software components and hardware components of a wind turbine product model separate from the wind turbine and representing a plurality of hardware components of the wind turbine, the wind turbine comprising at least one of a controller unit, a data storage unit, and a tower with a plurality of blades attached at a nacelle housing;

providing a plurality of software components each corresponding to a hardware component of the wind turbine product model;

providing, for each of the plurality of software components: (i) parameter information specifying one or more of a plurality of wind turbine component parameters of the wind turbine product model and (ii) hardware information pertaining to the corresponding hardware component, the plurality of wind turbine component parameters including blade length and tower height, wherein the blade length is associated with component parameter values of short and long, wherein the tower height is associated with component parameter values of short and high;

providing a set of wind turbine parameter compatibility rules between the plurality of wind turbine component parameters and including a first wind turbine parameter compatibility rule specifying to prohibit a user from setting the tower height to short when the blade length is set to long; and establishing a wind turbine configuration for the wind turbine software package by performing a series of iterations, each iteration comprising defining a group of wind turbine component parameter values based on the wind turbine parameter compatibility rules, and in response to receiving, as user input, an input parameter value corresponding to a hardware component of the wind turbine and selected from the groups of component parameter values:

updating a component parameter of a software component based on: (i) the input parameter value, (ii) the defined relationship between the hardware component and the software component, and (iii) the wind turbine parameter compatibility rules; and programmatically limiting the group of component parameter values in the next iteration in the series based on the input parameter value and the rules between the component parameters, in order to prohibit a user from applying a subsequent input parameter value incompatible with a previous input parameter value, wherein the user is in a first instance only permitted to set the tower height to high, based on the first wind turbine parameter compatibility rule.

9. The method according to claim 8, wherein each software component of the plurality of software components is a distinct software component corresponding to a distinct hardware component of the wind turbine product model, wherein the wind turbine configuration for the wind turbine software package is established by a wind turbine configuration tool having a graphical interface and operatively connected, via a predefined communications link, to the database, wherein the database comprises a wind turbine configuration database at a data center located remotely from the wind turbine, wherein the group of component parameter values is automatically limited without requiring any user input specifying to limit the group of component parameter values.

10. The method according to claim 9, wherein the plurality of wind turbine component parameters of the wind turbine product model further include gear type, which is associated with component parameter values of first gear type and second gear type, wherein programmatically limiting the group of component parameter values comprises, in a second instance:

upon determining that the blade length is set to short, permitting the user to set the tower height to each of short and high, respectively, wherein the user is not prohibited from setting the tower height to short.

11. The method according to claim 10, wherein establishing the wind turbine configuration for the wind turbine software package further comprises creating a configuration file, wherein the method further comprises:

establishing the wind turbine software package based on the wind turbine configuration and by selecting a set of software components from the plurality of software components, wherein the wind turbine software package is compressed and encoded;

downloading the wind turbine software package to the wind turbine; and storing the parameter information for the plurality of software components in the database.

12. The method according to claim 11, further comprising:

storing compatibility information between software components in a directed acyclic graph in order to facilitate compliance with compatibility between the plurality of software components;

transmitting the wind turbine configuration as a parameter set over the predefined communications link and to the database, wherein the transmitted copy is used in order to generate a parameter report providing an overview of the wind turbine configuration; and transferring a file containing the wind turbine configuration for the wind turbine software package and to the controller unit, wherein the controller unit is configured to control operation of the plurality of hardware components of the wind turbine, based on the wind turbine configuration, wherein the data storage unit is configured to store the wind turbine configuration, the wind turbine software package, and the plurality of software components.

13. The method according to claim 8, wherein establishing the wind turbine configuration further comprises creating a configuration file.

14. The method according to claim 8, further comprising:

establishing the wind turbine software package based on the wind turbine configuration and by selecting a set of software components from the plurality of software components; and downloading the wind turbine software package to the wind turbine.

15. The method according to claim 8, further comprising:

storing the parameter information for the plurality of software components in the database.

16. The method according to claim 8, further comprising:

storing compatibility information between software components in a directed acyclic graph.

17. The method according to claim 8, further comprising:

transmitting a copy of the wind turbine configuration to the database, wherein the database is located remotely from the wind turbine.

\* \* \* \* \*